(12) United States Patent
Zhen et al.

(10) Patent No.: US 10,268,443 B2
(45) Date of Patent: Apr. 23, 2019

(54) EARPHONE STATUS DETECTION METHOD AND TERMINAL

(71) Applicant: Huawei Technologies Co., Ltd., Shenzhen (CN)

(72) Inventors: Haitao Zhen, Wuhan (CN); Wentao Yang, Wuhan (CN); Yongxiang Yang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/561,819

(22) PCT Filed: Mar. 21, 2016

(86) PCT No.: PCT/CN2016/076892
§ 371 (c)(1),
(2) Date: Sep. 26, 2017

(87) PCT Pub. No.: WO2016/155528
PCT Pub. Date: Oct. 6, 2016

(65) Prior Publication Data
US 2018/0121156 A1    May 3, 2018

(30) Foreign Application Priority Data
Mar. 27, 2015  (CN) .......................... 2015 1 0142549

(51) Int. Cl.
*G06F 3/16*  (2006.01)
*G10L 19/00*  (2013.01)
(Continued)

(52) U.S. Cl.
CPC .............. *G06F 3/165* (2013.01); *G10L 19/00* (2013.01); *H04R 1/1041* (2013.01); *H04R 3/12* (2013.01);
(Continued)

(58) Field of Classification Search
USPC ........ 381/74, 151, 309, 367, 370, 376, 94.3, 381/98, 150
See application file for complete search history.

(56) References Cited

U.S. PATENT DOCUMENTS

| | | | |
|---|---|---|---|
| 6,154,538 | A | 11/2000 | Nakano |
| 2009/0154720 | A1 | 6/2009 | Oki |

(Continued)

FOREIGN PATENT DOCUMENTS

| | | |
|---|---|---|
| CN | 101014207 A | 8/2007 |
| CN | 101232743 A | 7/2008 |

(Continued)

*Primary Examiner* — Yosef K Laekemariam
(74) *Attorney, Agent, or Firm* — Leydig, Voit & Mayer, Ltd.

(57) ABSTRACT

A method used by a terminal to detect an earphone status and a terminal are disclosed. The method includes: disabling, by a processor, a path for outputting an audio signal to a second earphone; detecting electrical signals of a first audio output end and a third audio output end of a first earphone; and determining a frequency value of a low-frequency resonant point of the first earphone according to the electrical signals of the first audio output end and the third audio output end, and determining, according to the frequency value of the low-frequency resonant point, whether the first earphone is in an in-position state. In this way, only the electrical signals of the first audio output end and the third audio output end need to be detected, and it may be determined, according to changes of the electrical signals.

20 Claims, 15 Drawing Sheets

(51) Int. Cl.
  *H04R 1/10* (2006.01)
  *H04R 3/12* (2006.01)
  *H04R 5/033* (2006.01)
  *H04R 29/00* (2006.01)

(52) U.S. Cl.
  CPC ............ *H04R 5/033* (2013.01); *H04R 29/001* (2013.01); *H04R 2420/03* (2013.01); *H04R 2460/15* (2013.01)

(56) References Cited

U.S. PATENT DOCUMENTS

| | | |
|---|---|---|
| 2010/0189269 A1 | 7/2010 | Haartsen et al. |
| 2010/0246836 A1* | 9/2010 | Johnson, Jr. ............. H04R 5/04 381/58 |
| 2012/0207319 A1 | 8/2012 | Tsuchiya et al. |
| 2012/0281845 A1 | 11/2012 | Siotis |
| 2013/0279724 A1 | 10/2013 | Stafford et al. |
| 2013/0345842 A1* | 12/2013 | Karakaya ................. H04R 5/04 700/94 |
| 2014/0242964 A1 | 8/2014 | Seo et al. |

FOREIGN PATENT DOCUMENTS

| | | |
|---|---|---|
| CN | 102365875 A | 2/2012 |
| CN | 102638742 A | 8/2012 |
| EP | 2178280 A1 | 4/2010 |
| JP | H10327225 A | 12/1998 |
| JP | 2000036994 A | 2/2000 |
| JP | 2001359186 A | 12/2001 |
| JP | 2004328419 A | 11/2004 |
| JP | 2012015716 A | 1/2012 |
| JP | 2012169839 A | 9/2012 |
| JP | 2013240008 A | 11/2013 |
| JP | 2014165925 A | 9/2014 |
| KR | 20110107833 A | 10/2011 |
| WO | 2008000304 A1 | 1/2008 |

* cited by examiner

EARPHONE STATUS DETECTION METHOD AND TERMINAL

CROSS-REFERENCE TO RELATED APPLICATION

This application is a National Stage of International Application No. PCT/CN2016/076892, filed on Mar. 21, 2016, which claims priority to Chinese Patent Application No. 201510142549.9, Mar. 27, 2015. Both of the aforementioned applications are hereby incorporated by reference in their entireties.

TECHNICAL FIELD

The present invention relates to detection technologies, and in particular, to an earphone status detection method and a terminal.

BACKGROUND

Currently, mobile devices have gradually replaced conventional audio and video playback devices such as an MP3 and an MP4 and become main options for playing music and videos by consumers. However, as mobile devices become miniaturized, light, and thin in design, there is a higher design requirement for low power consumption. Therefore, multiple policies for reducing power consumption emerge. For example, different software policies are selected according to whether an earphone is in an in-position state (that an earphone is in an in-position state refers to a state in which the earphone is worn on an ear of a person), to achieve an objective of power consumption reduction.

In the prior art, whether an earphone is in an in-position state is detected by providing a built-in capacitive sensor in the earphone. When an earphone comes close to an ear of a person, the ear of the person causes a capacitance of a capacitive sensor to change. As a distance between the earphone and the ear of the person shortens, the capacitance of the capacitive sensor becomes larger. When the ear of the person is in direct contact with the earphone, the capacitance of the capacitive sensor reaches a maximum value. A processor determines whether the earphone is in position by using a capacitance sent by the capacitive sensor.

In the foregoing solution, a built-in capacitive sensor needs to be provided in an earphone. Therefore, the additionally added hardware increases costs of the earphone, and increases complexity of a circuit design of the earphone. Consequently, how to simply and quickly detect an in-position state of an earphone is a problem that needs to be resolved urgently.

SUMMARY

In view of this, embodiments of the present invention provide a method used by a terminal to detect an earphone status and a terminal, to simply and quickly detect an earphone status.

According to a first aspect, an embodiment of the present invention provides a method used by a terminal to detect an earphone status, where the method is applied to a terminal, the terminal includes a processor, an earphone connector, and a first detection unit, the earphone connector includes a first audio output end, a second audio output end, and a third audio output end, the first audio output end is configured to connect to a first audio input end of an externally connected first earphone, the second audio output end is configured to connect to a second audio input end of an externally connected second earphone, the third audio output end is configured to connect to a second audio input end of the first earphone and a first audio input end of the second earphone, and the method includes: disabling, by the processor, a path for outputting an audio signal to the second earphone; after the processor disables the path for outputting the audio signal to the second earphone, detecting, by the first detection unit, an electrical signal of the first audio output end and an electrical signal of the third audio output end; determining, by the first detection unit, a first frequency value of a low-frequency resonant point of the first earphone according to the electrical signal of the first audio signal end and the electrical signal of the third audio signal end; and determining, by the first detection unit according to the first frequency value, whether the first earphone is in an in-position state.

In a first possible implementation manner of the first aspect, the method further includes: stopping, by the processor, audio output to the first earphone if the first earphone is in an out-of-position state.

With reference to the first aspect or the first possible implementation manner of the first aspect, in a second possible implementation manner of the first aspect, before the disabling, by the processor, a path for outputting an audio signal to the second earphone, the method further includes: determining, by the processor, whether an audio signal is output to the first earphone and the second earphone; and if an audio signal is output to the first earphone and the second earphone, performing, by the processor, the step of disabling a path for outputting an audio signal to the second earphone.

According to the second possible implementation manner of the first aspect, in a third possible implementation manner of the first aspect, after the processor determines that an audio signal is output to the first earphone and the second earphone, and before the disabling, by the processor, a path for outputting an audio signal to the second earphone, the method further includes: determining, by the processor, whether an audio source of the audio signal is being switched; and if the audio source of the audio signal is being switched, performing, by the processor, the step of disabling a path for outputting an audio signal to the second earphone.

According to any one of the possible implementation manners of the first aspect, in a fourth possible implementation manner of the first aspect, the terminal further includes a second detection unit, and the method further includes: disabling, by the processor, a path for outputting an audio signal to the first earphone; detecting, by the second detection unit, an electrical signal of the second audio output end and an electrical signal of the third audio output end; determining, by the second detection unit, a second frequency value of a low-frequency resonant point of a front sound cavity of the second earphone according to the electrical signal of the second audio signal end and the electrical signal of the third audio signal end; and determining, by the second detection unit according to the second frequency value, whether the second earphone is in an in-position state.

According to the fourth possible implementation manner of the first aspect, in a fifth possible implementation manner of the first aspect, the method further includes: stopping, by the processor, audio output to the second earphone if the second earphone is in an out-of-position state.

According to any one of the possible implementation manners of the first aspect, in a sixth possible implementation manner of the first aspect, the terminal further includes:

a first audio decoder configured to output an audio signal to the first earphone, a second audio decoder configured to output an audio signal to the second earphone, and a switching switch, the first audio decoder includes a fourth audio output end, a fifth audio output end, and a GND terminal, the second audio decoder includes a sixth audio output end, a seventh audio output end, and a GND terminal; the fourth audio output end is connected to the first audio output end, and the seventh audio output end is connected to the second audio output end; the switching switch includes a first input end, a second input end, an output end, and a control end, and the switching switch is configured to: under control of a control signal that is input by the control end, connect the output end of the switching switch to either of the first input end and the second input end of the switching switch; the fifth audio output end is connected to the first input end of the switching switch, the GND terminal of the first decoder and the GND terminal of the second decoder are connected to the second input end of the switching switch, and the output end of the switching switch is connected to the third audio output end; and the disabling, by the processor, a path for outputting an audio signal to the second earphone includes: inputting, by the processor, a first control signal to the control end of the switching switch, to control the first input end of the switching switch and the output end of the switching switch to connect to each other.

According to the sixth possible implementation manner of the first aspect, in a seventh possible implementation manner of the first aspect, the switching switch further includes a third input end, the switching switch is specifically configured to: under control of a control signal that is input by the control end, connect the output end of the switching switch to one of the first input end, the second input end, and the third input end of the switching switch, and the sixth audio output end is connected to the third input end of the switching switch; and the disabling, by the processor, a path for outputting an audio signal to the first earphone includes: inputting, by the processor, a second control signal to the control end of the switching switch, to control the third input end of the switching switch and the output end of the switching switch to connect to each other.

According to any one of the possible implementation manners of the first aspect, in an eighth possible implementation manner of the first aspect, the terminal further includes a first audio decoder configured to output an audio signal to the first earphone, and the disabling, by the processor, a path for outputting an audio signal to the first earphone includes: controlling, by the processor, the first audio decoder to be disabled.

According to the eighth possible implementation manner of the first aspect, in a ninth possible implementation manner of the first aspect, the terminal further includes a second audio decoder configured to output an audio signal to the second earphone, and the disabling, by the processor, a path for outputting an audio signal to the second earphone includes: controlling, by the processor, the second audio decoder to be disabled.

According to any one of the possible implementation manners of the first aspect, in a tenth possible implementation manner of the first aspect, the stopping, by the processor, audio output to the first earphone or the second earphone if the first earphone or the second earphone is in an out-of-position state includes: if the first earphone or the second earphone is in an out-of-position state, performing, by the processor, search to determine whether a preset application program list includes a currently running application program; and if the preset application program list includes the currently running application program, pausing the currently running application program.

According to the tenth possible implementation manner of the first aspect, in an eleventh possible implementation manner of the first aspect, the preset application program list includes a game application program or a video application program.

According to any one of the possible implementation manners of the first aspect, in a twelfth possible implementation manner of the first aspect, the stopping, by the processor, audio output to the first earphone or the second earphone if the first earphone or the second earphone is in an out-of-position state includes: if the first earphone or the second earphone is in an out-of-position state, detecting, by the processor, whether the terminal is in a call state; and if the terminal is in a call state, ending a call or switching a call to a speaker mode.

According to a second aspect, an embodiment of the present invention provides a terminal, where the terminal includes: a processor, an earphone connector, a first detection unit, a first audio decoder, and a second audio decoder, the earphone connector includes a first audio output end, a second audio output end, and a third audio output end, the first audio output end is configured to connect to a first audio input end of an externally connected first earphone, the second audio output end is configured to connect to a second audio input end of an externally connected second earphone, the third audio output end is configured to connect to a second audio input end of the first earphone and a first audio input end of the second earphone, the first detection unit is separately connected to the first audio output end and the third audio output end, the first audio decoder outputs an audio signal to the first earphone by using the first audio output end and the second audio output end, the second audio decoder is connected to the second audio output end and the third audio output end to output an audio signal to the second earphone, and the terminal includes: the processor, configured to disable a path for outputting an audio signal to the second earphone; and the first detection unit, configured to detect an electrical signal of the first audio output end and an electrical signal of the third audio output end, where the first detection unit is further configured to: determine a frequency value of a low-frequency resonant point of the first earphone according to the electrical signal of the first audio signal end and the electrical signal of the third audio signal end, and determine, according to the frequency value of the low-frequency resonant point, whether the first earphone is in an in-position state.

In a first possible implementation manner of the first aspect, the processor is further configured to stop audio output to the first earphone if the first earphone is in an out-of-position state.

With reference to the first aspect or the first possible implementation manner of the first aspect, in a second possible implementation manner of the first aspect, the processor is further configured to determine whether an audio signal is output to the first earphone and the second earphone; and that the processor is configured to disable a path for outputting an audio signal to the second earphone is specifically: the processor is configured to: if an audio signal is output to the first earphone and the second earphone, disable the path for outputting the audio signal to the second earphone.

According to the second possible implementation manner of the first aspect, in a third possible implementation manner of the first aspect, the processor is further configured to determine whether an audio source of the audio signal is being switched; and that the processor is configured to disable a path for outputting an audio signal to the second earphone is specifically: the processor is configured to: if an audio signal is output to the first earphone and the second earphone, and the audio source of the audio signal is being switched, disable, by the processor, the path for outputting the audio signal to the second earphone.

According to any one of the possible implementation manners of the first aspect, in a fourth possible implementation manner of the first aspect, the terminal further includes a second detection unit, and the second detection unit is separately connected to the second audio output end and the third audio output end; the processor is further configured to disable a path for outputting an audio signal to the first earphone; the second detection unit is configured to: after the processor disables the path for outputting the audio signal to the first earphone, detect an electrical signal of the second audio output end and an electrical signal of the third audio output end; and the second detection unit is further configured to: determine a frequency value of a low-frequency resonant point of the second earphone according to the electrical signal of the second audio signal end and the electrical signal of the third audio signal end, and determine, according to the frequency value of the low-frequency resonant point, whether the second earphone is in an in-position state.

According to the fourth possible implementation manner of the first aspect, in a fifth possible implementation manner of the first aspect, the processor is further configured to stop audio output to the second earphone if the second earphone is in an out-of-position state.

According to any one of the possible implementation manners of the first aspect, in a sixth possible implementation manner of the first aspect, the terminal further includes a switching switch, the first audio decoder includes a fourth audio output end, a fifth audio output end, and a GND terminal, the second audio decoder includes a sixth audio output end, a seventh audio output end, and a GND terminal, the fourth audio output end is connected to the first audio output end, and the seventh audio output end is connected to the second audio output end are connected; the switching switch includes a first input end, a second input end, an output end, and a control end, and the switching switch is configured to: under control of a control signal that is input by the control end, connect the output end of the switching switch to either of the first input end and the second input end of the switching switch; and the fifth audio output end is connected to the first input end of the switching switch, the GND terminal of the first decoder and the GND terminal of the second decoder are connected to the second input end of the switching switch, and the output end of the switching switch is connected to the third audio output end; and the processor is further configured to input a first control signal to the control end of the switching switch, to control the first input end of the switching switch and the output end of the switching switch to connect to each other.

According to the sixth possible implementation manner of the first aspect, in a seventh possible implementation manner of the first aspect, the switching switch further includes a third input end, the switching switch is specifically configured to: under control of a control signal that is input by the control end, connect the output end of the switching switch to one of the first input end, the second input end, and the third input end of the switching switch, and the sixth audio output end is connected to the third input end of the switching switch; and the processor is further configured to input a second control signal to the control end of the switching switch, to control the third input end of the switching switch and the output end of the switching switch to connect to each other.

According to any one of the possible implementation manners of the first aspect, in an eighth possible implementation manner of the first aspect, the processor is further configured to control the first audio decoder to be disabled.

According to the eighth possible implementation manner of the first aspect, in a ninth possible implementation manner of the first aspect, the processor is further configured to control the second audio decoder to be disabled.

According to any one of the possible implementation manners of the first aspect, in a tenth possible implementation manner of the first aspect, that the processor is further configured to stop audio output to the first earphone if the first earphone is in an out-of-position state is specifically: the processor is further configured to: if the first earphone or the second earphone is in an out-of-position state, perform search to determine whether a preset application program list includes a currently running application program; and if the preset application program list includes the currently running application program, pause the currently running application program.

According to the tenth possible implementation manner of the first aspect, in an eleventh possible implementation manner of the first aspect, the preset application program list includes a game application program or a video application program.

According to any one of the possible implementation manners of the first aspect, in a twelfth possible implementation manner of the first aspect, that the processor is further configured to stop audio output to the first earphone if the first earphone is in an out-of-position state is specifically: the processor is further configured to: if the first earphone or the second earphone is in an out-of-position state, detect whether the terminal is in a call state; and if the terminal is in a call state, end a call or switch a call to a speaker mode.

The embodiments of the present invention provide the method used by a terminal to detect an earphone status and the terminal. The method includes: disabling, by a processor, a path for outputting an audio signal to a second earphone (currently, an earphone status of the second earphone is not detected); detecting electrical signals of a first audio output end and a third audio output end of a first earphone; and determining a frequency value of a low-frequency resonant point of the first earphone according to the electrical signals of the first audio signal and the third audio signal end, and determining, according to the frequency value of the low-frequency resonant point, whether the first earphone is in an in-position state. In this way, only the electrical signals of the first audio signal and the third audio signal need to be detected, and it may be determined, according to changes of the electrical signals, whether the earphone is in position. Therefore, a status of the first earphone can be simply and quickly detected.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

For ease of understanding, the following several concepts are described first before describing the embodiments provided in the present invention. An earphone mentioned in the embodiments of the present invention refers to the left earphone or the right earphone configured for audio playback, and the earphones may include in-ear earphones and head-mounted earphones. An earphone status may include two types: a state in which an earphone is worn on a human ear, and a state in which an earphone is not worn on a human ear. For ease of description, the state in which an earphone is worn on a human ear is briefly referred to as an in-position state, and the state in which an earphone is not worn on a human ear is briefly referred to as an out-of-position state.

Figure 1:
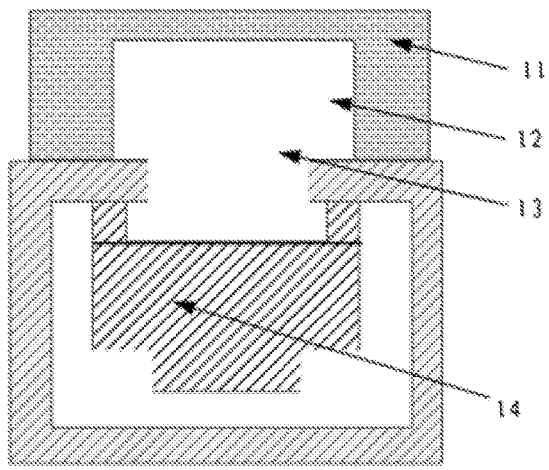
FIG. 1 shows a simplified model in which an earphone is in an in-position state.

FIG. 1 shows a simplified model in which an earphone is in an in-position state. As shown in FIG. 1, the simplified model includes a human ear model 11, an ear canal 12, a front sound cavity 13 of an earphone, and a built-in loudspeaker 14 of the earphone. When the earphone is in an in-position state, the front sound cavity 13 of the earphone is airtight space enclosed by the human ear model 11 and the built-in loudspeaker 14 of the earphone. When the earphone is in an in-position state (the front sound cavity of the earphone is airtight), a frequency value f0 of a low-frequency resonant point ranges from 500 Hz to 950 Hz; when the earphone is in an out-of-position state (the front sound cavity of the earphone is open), the frequency value f0 of the low-frequency resonant point is 2000 Hz or higher.

As can be known from the foregoing description, when an earphone status changes, a frequency value of a low-frequency resonant point of the earphone obviously changes. As electrical components such as a capacitor and an inductor are included in the earphone, a change of the frequency value of the low-frequency resonant point causes a resistance of the electrical component to change, and a change of the resistance causes an electrical signal to change. In this way, an earphone status can be quickly detected by detecting a change of an electrical signal passing through the earphone. The electrical signal may include a voltage signal and a current signal.

Figure 2:
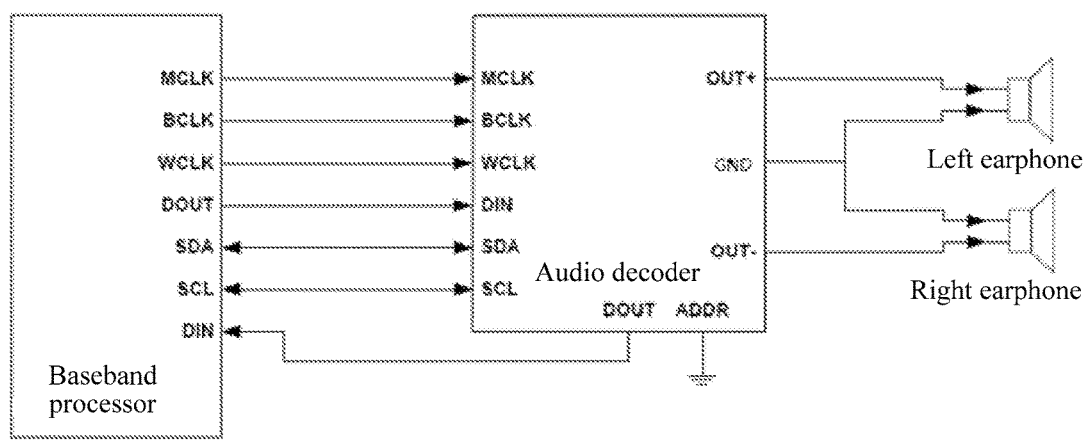
FIG. 2 is a drive circuit diagram of a conventional earphone.

FIG. 2 is a drive circuit diagram of a conventional earphone. As shown in FIG. 2, audio digital interfaces on a baseband processor and an audio codec are briefly described in the drive circuit diagram. The audio digital interfaces on the baseband processor and the audio codec are designed in correspondence with each other, and the audio digital interfaces include data input DIN, data output DOUT, clock BCLK, sampling/frame rate WCLK, MCLK, SDA, SCL, and the like. MCLK may be used for reset (or may not be used), and SDA and SCL are configuration interfaces of the audio codec, and are used to configure common information such as an address.

A DOUT interface on the baseband processor outputs an audio signal from the baseband processor to the audio codec, and the audio codec decodes the audio signal to obtain a decoded audio signal, and drives the left earphone and the right earphone to play the decoded audio signal.

A sound signal collected from the outside (for example, collected by using a microphone, where sound collection is unrelated to the present invention and is not shown in the figure) is first coded by the audio codec to obtain an audio signal, and the audio signal is output from a DOUT pin of the codec to a DIN pin of the baseband processor, so that the baseband processor further performs processing to form a signal that may be processed by an application processor (not shown in the figure).

That the processor determines whether there is audio output in this specification refers to whether an audio signal is output from the baseband processor.

Figure 3:
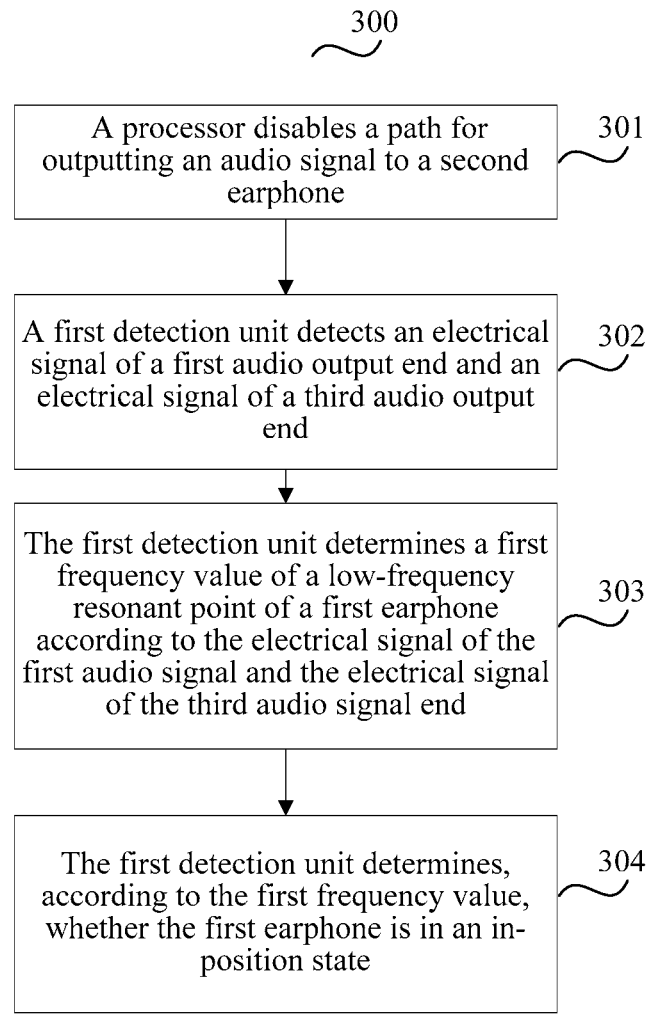
FIG. 3 is a flowchart of a method used by a terminal to detect an earphone status according to an embodiment of the present invention.

FIG. 3 is a flowchart of a method used by a terminal to detect an earphone status according to an embodiment of the present invention. The method is applied to a terminal, and the terminal includes a processor, an earphone connector, and a first detection unit.

It should be noted that, in the method used by a terminal to detect an earphone status provided in this embodiment of the present invention, the terminal may detect only a status of a first earphone, and the first earphone may be the left earphone or the right earphone. In this way, only a detection unit configured to detect the first earphone may be added, and an actual circuit structure is simple and can be easily implemented. Assuming that the left earphone is detected according to initial settings, a user may be prompted: "If an earphone needs to be used to listen to audio, preferentially use the left earphone", so that a detection result is more accurate and credible.

Figure 4:
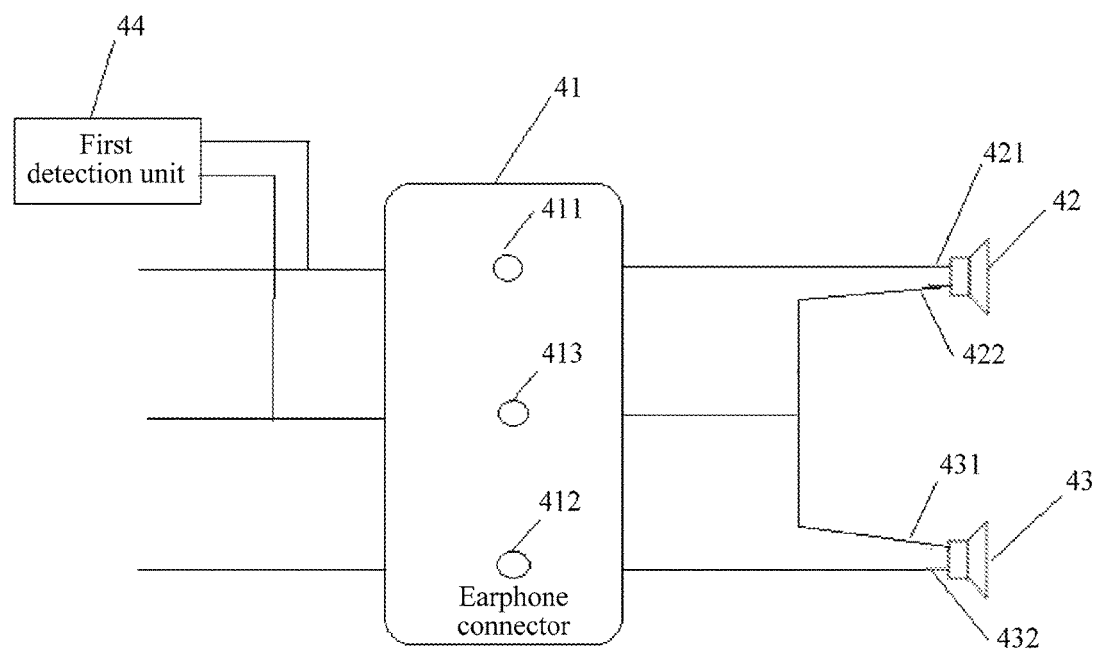
FIG. 4 is a schematic diagram of a connection among an earphone connector, a first detection unit, a first earphone, and a second earphone.

FIG. 4 is a schematic diagram of a connection among an earphone connector, a first detection unit, a first earphone, and a second earphone. As shown in FIG. 4, an earphone connector 41 includes a first audio output end 411, a second audio output end 412, and a third audio output end 413. The first audio output end 411 is configured to connect to a first audio input end 421 of an externally connected first earphone 42, the second audio output end 412 is configured to connect to a second audio input end 432 of an externally connected second earphone 43, the third audio output end 413 is configured to connect to a second audio input end 422 of the first earphone 42 and a first audio input end 431 of the second earphone 43, and the first detection unit 44 is separately connected to the first audio output end 411 and the third audio output end 413.

It should be noted that, the first detection unit 44 may be disposed in a manner that the first detection unit 44 is directly connected to the first audio output end 411 and the third audio output end 413, or may be disposed in a manner that the first detection unit 44 is connected to any points on a path connected to the first audio output end 411 and a path connected to the third audio output end 413, as long as it is ensured that detected electrical signals are the same as electrical signals detected on the first audio output end 411 and the third audio output end 413.

The method 300 includes the following steps.

Step 301: A processor disables a path for outputting an audio signal to the second earphone.

Step 302: The first detection unit detects an electrical signal of the first audio output end 411 and an electrical signal of the third audio output end 413, where the electrical signal may include a voltage signal and a current signal.

Step 303: The first detection unit determines a first frequency value of a low-frequency resonant point of the first earphone 42 according to the electrical signal of the first audio signal 411 and the electrical signal of the third audio signal end 413.

It should be noted that the first detection unit determines an impedance value R1 of the earphone according to the electrical signal of the first audio signal 411 and the electrical signal of the third audio signal end 413, and obtains the frequency value f01 of the low-frequency resonant point according to a correspondence between the impedance value R1 and the first frequency value.

Step 304: The first detection unit determines, according to the first frequency value, whether the first earphone 42 is in an in-position state.

It should be noted that, the first detection unit includes a first detection circuit and a first processing unit, the first detection circuit is configured to perform step 302, and the first processing unit is configured to perform step 303 and step 304.

Generally, when the earphone is in an in-position state (a front sound cavity of the earphone is airtight), a frequency value f0 of a low-frequency resonant point ranges from 500 Hz to 950 Hz; when the earphone is in an out-of-position state (the front sound cavity of the earphone is open), the frequency value f0 of the low-frequency resonant point is 2000 Hz or higher.

It should be noted that, the processor disables the path for outputting the audio signal to the second earphone, so that an independent loop is formed on the first earphone (as shown in FIG. 4, when the first earphone and the second earphone work simultaneously, loops formed on the first earphone and the second earphone partially overlap), to prevent the loop formed on the second earphone from affecting the loop formed on the first earphone. Therefore, after the detection operation is completed, the path for outputting the audio signal to the second earphone needs to be enabled immediately, to ensure that the first earphone and the second earphone can simultaneously work normally.

According to the method used by a terminal to detect an earphone status provided in this embodiment of the present invention, a processor disables a path for outputting an audio signal to a second earphone (currently, an earphone status of the second earphone is not detected); detects electrical signals of a first audio output end and a third audio output end of a first earphone; and determines a frequency value of a low-frequency resonant point of the first earphone according to the electrical signals of the first audio signal and the third audio signal end, and determines, according to the frequency value of the low-frequency resonant point, whether the first earphone is in an in-position state. In this way, only the electrical signals of the first audio signal and the third audio signal need to be detected, and it may be determined, according to changes of the electrical signals, whether the earphone is in position. Therefore, a status of the first earphone can be simply and quickly detected.

Figure 5:
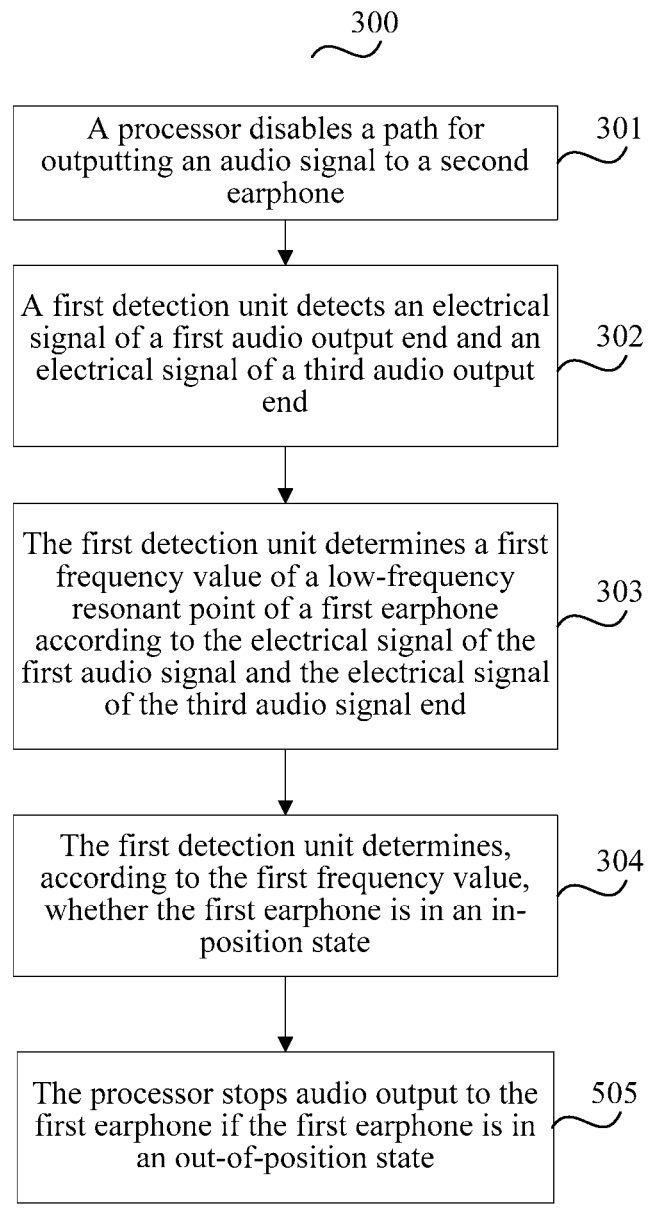
FIG. 5 is a flowchart of a method used by a terminal to detect an earphone status according to another embodiment of the present invention.

FIG. 5 is a flowchart of a method used by a terminal to detect an earphone status according to another embodiment of the present invention.

Optionally, the method 300 further includes:

Step 505: The processor stops audio output to the first earphone if the first earphone is in an out-of-position state.

If the first earphone is in an out-of-position state, it indicates that the first earphone is not used by a user, and it is useless to input audio to the first earphone. Therefore, the processor stops in a timely manner audio output to the first earphone, to effectively reduce electricity consumed by audio output to the first earphone.

Figure 6:
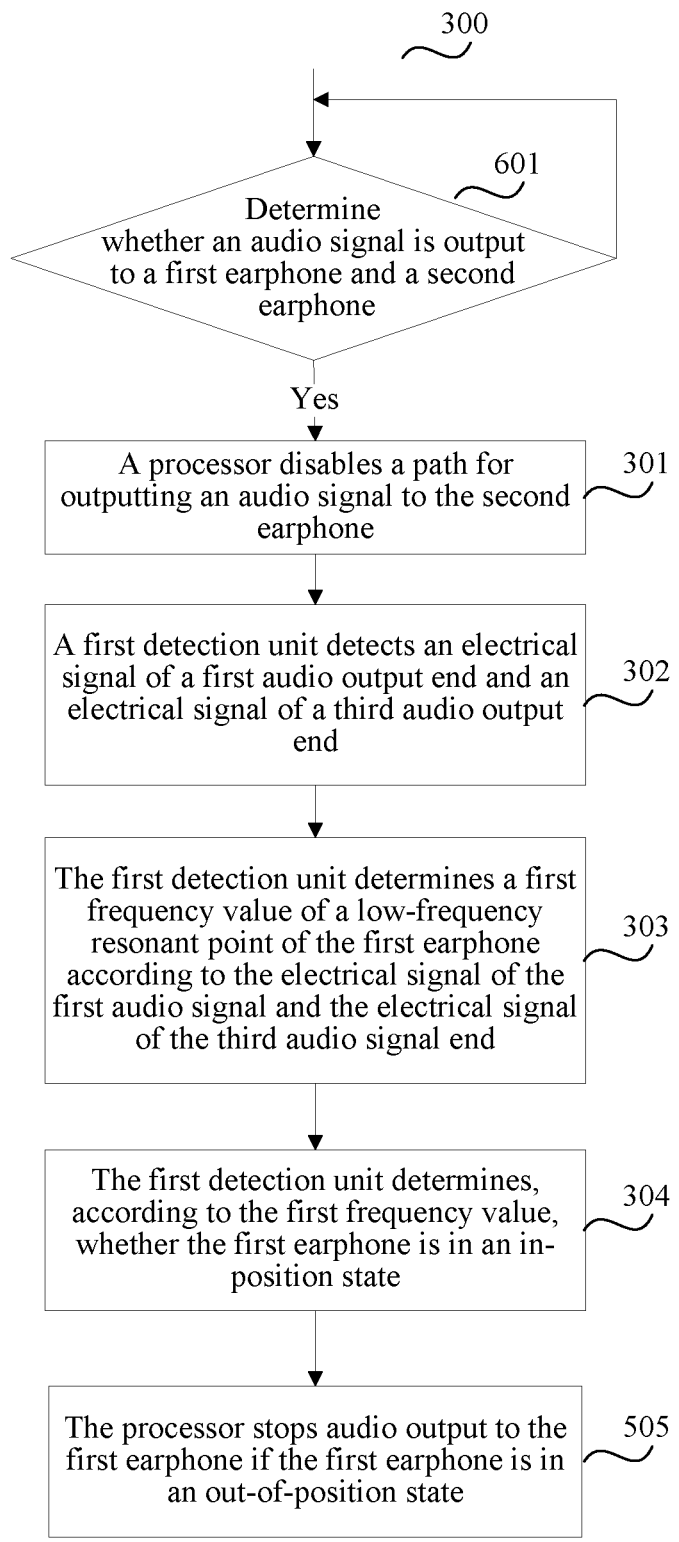
FIG. 6 is a flowchart of a method used by a terminal to detect an earphone status according to still another embodiment of the present invention.

FIG. 6 is a flowchart of a method used by a terminal to detect an earphone status according to still another embodiment of the present invention.

Optionally, before step 301, the method 300 further includes:

Step 601: The processor determines whether an audio signal is output to the first earphone and the second earphone; if an audio signal is output to the first earphone and the second earphone, perform step 301.

It should be noted that, the processor may periodically start determining whether an audio signal is output to the first earphone and the second earphone, or may start in real time determining whether an audio signal is output to the first earphone and the second earphone, or may detect start of a preset application program to trigger starting determining whether an audio signal is output to the first earphone and the second earphone. A specific manner may be set according to an actual requirement, and is not specifically limited in this embodiment of the present invention.

Figure 7:
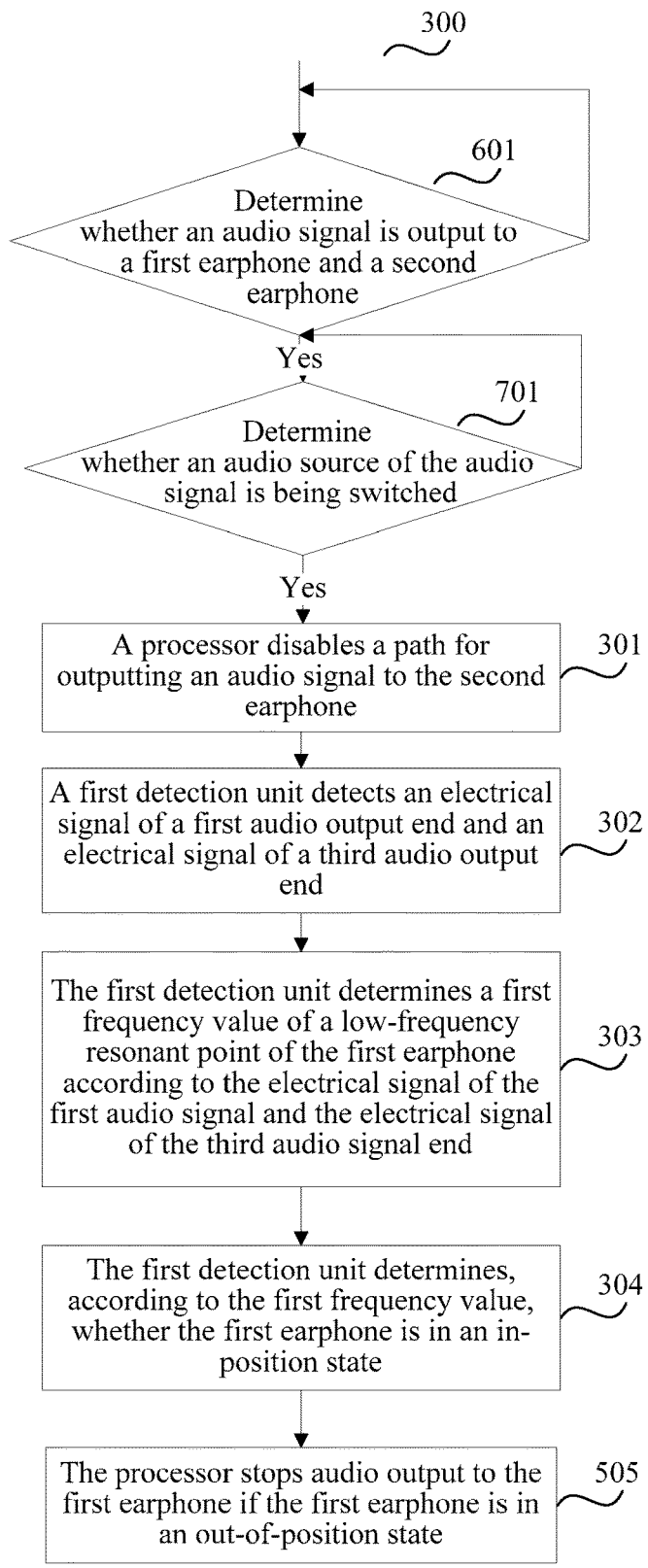
FIG. 7 is a flowchart of a method used by a terminal to detect an earphone status according to still another embodiment of the present invention.

FIG. 7 is a flowchart of a method used by a terminal to detect an earphone status according to still another embodiment of the present invention.

Optionally, after the result in step 601 is that the processor determines that an audio signal is output to the first earphone and the second earphone, before step 301, the method 300 further includes:

Step 701: The processor determines whether an audio source of the audio signal is being switched; if the audio source of the audio signal is being switched, perform step 301.

It should be noted that, whether the audio source is being switched refers to switching from a currently played audio source to a next audio source. This operation may be performed after a user touches a switching key, or may be automatically switching to a next audio source after a currently played audio source ends.

Optionally, an audio playback application program reports information such as playback start, playback completion, and playback content in an audio playback process, and the processor determines, according to the obtained information, whether an audio source is being switched.

According to the method used by a terminal to detect an earphone status provided in this embodiment of the present invention, an opportunity of switching an audio source is detected, and an earphone status is detected in a process of switching the audio source. In this way, normally playing the audio source by a user is not affected, and earphone status detection is already completed without being perceived by the user, thereby greatly improving user experience of the terminal.

Figure 8:
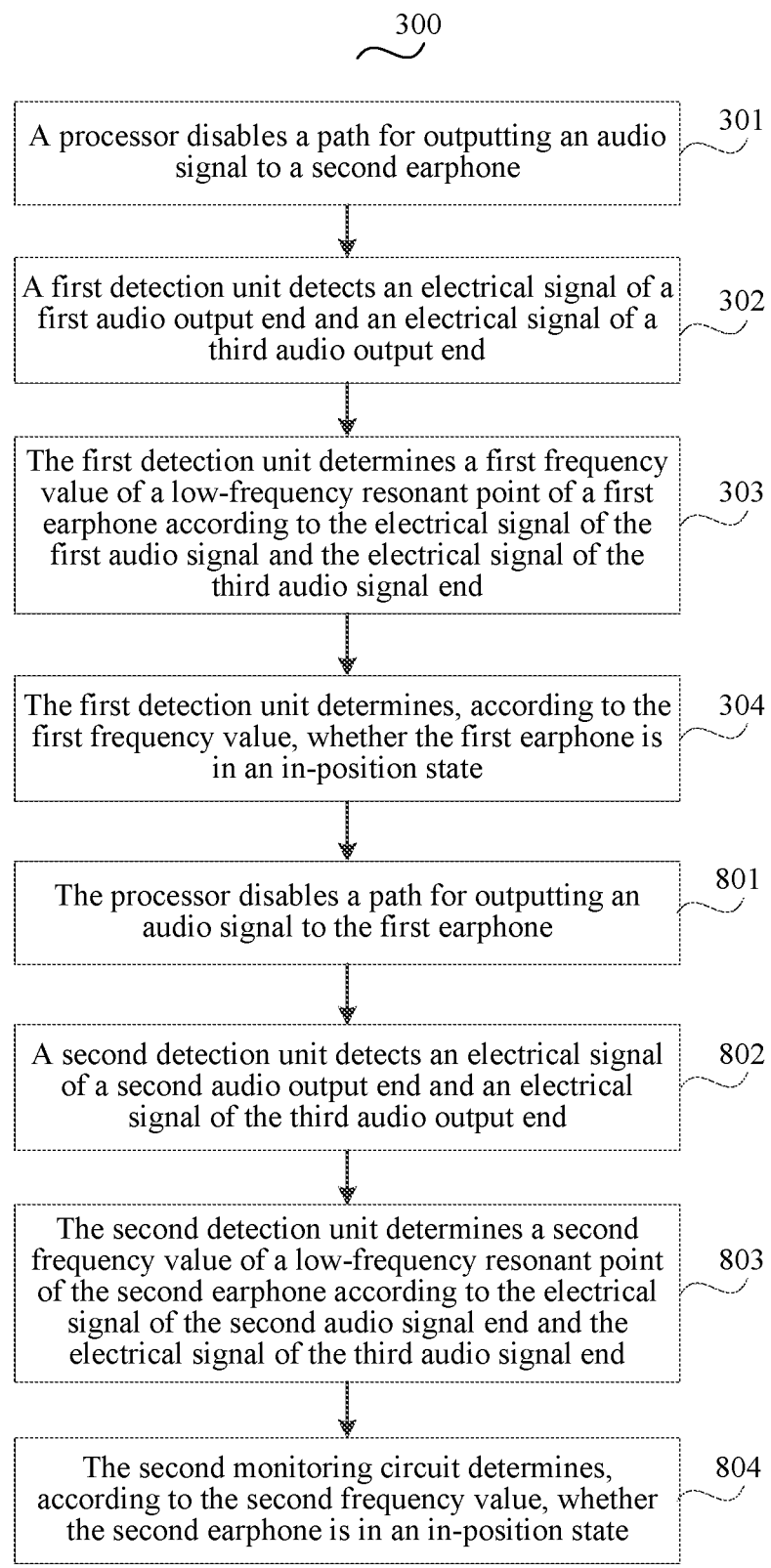
FIG. 8 is a flowchart of a method used by a terminal to detect an earphone status according to still another embodiment of the present invention.

FIG. 8 is a flowchart of a method used by a terminal to detect an earphone status according to still another embodiment of the present invention. The terminal further includes a second detection unit 45, and the second detection unit is separately connected to the second audio output end 412 and the third audio output end 413.

Figure 9:
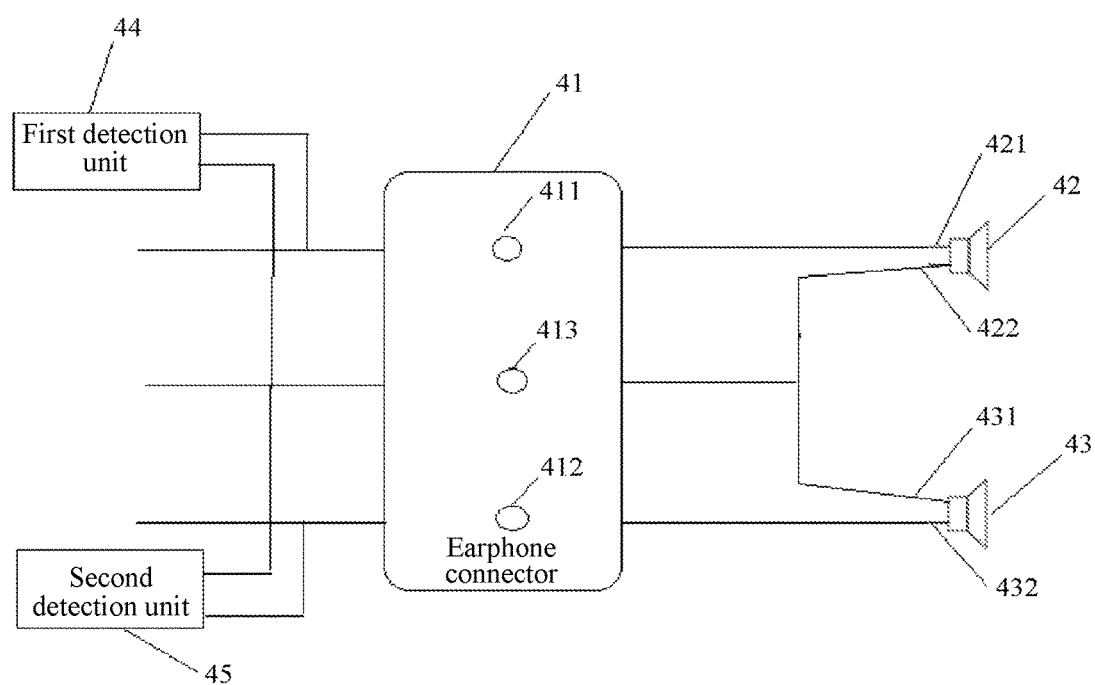
FIG. 9 is a diagram of a connection relationship among a first detection unit, a second detection unit, an earphone connector, an externally connected first earphone, and an externally connected second earphone when both statuses of the left earphone and the right earphone are detected.

FIG. 9 is a diagram of a connection relationship among a first detection unit, a second detection unit, an earphone connector, an externally connected first earphone, and an externally connected second earphone when both statuses of the left earphone and the right earphone are detected.

It should be noted that, in FIG. 9, the first detection unit 44 and the second detection unit 45 are separate hardware. Actually, the first detection unit 44 and the second detection unit 45 may also be combined into one detection unit. When the first detection unit 44 and the second detection unit 45 are combined into one detection unit, a connection line for connecting to the third audio output end 413 may be omitted, thereby simplifying the circuit.

It should be noted that, in the method used by a terminal to detect an earphone status provided in this embodiment the present invention, the terminal may detect statuses of the first earphone and the second earphone sequentially. In this way, a user does not need to be prompted in advance with an earphone that is preferentially used for audio playback. Regardless of either earphone used by the user for audio playback, the terminal can complete detection of statuses of the first earphone and the second earphone.

This embodiment of the present invention is implemented based on the embodiment shown in FIG. 3, and only content different from that of FIG. 3 is described in detail herein. For other content, refer to a related description in FIG. 3, and details are not described herein again. As shown in FIG. 8, the method 300 further includes the following steps.

Step 801: The processor disables a path for outputting an audio signal to the first earphone 42.

Step 802: The second detection unit detects an electrical signal of the second audio output end and an electrical signal of the third audio output end.

Step 803: The second detection unit determines a second frequency value of a low-frequency resonant point of the second earphone according to the electrical signal of the second audio signal end and the electrical signal of the third audio signal end.

It should be noted that, the second detection unit determines an impedance value R2 of the earphone according to the electrical signal of the second audio signal 412 and the electrical signal of the third audio signal end 413, and obtains the frequency value f02 of the low-frequency resonant point according to a correspondence between the impedance value R2 and the second frequency value.

Step 804: The second monitoring circuit determines, according to the second frequency value, whether the second earphone is in an in-position state.

It should be noted that, the second detection unit includes a second detection circuit and a second processing unit, the second detection circuit is configured to perform step 802, and the second processing unit is configured to perform step 803 and step 304.

It should be noted that, the processor disables the path for outputting the audio signal to the second earphone, so that an independent loop is formed on the first earphone (because as shown in FIG. 9, the second audio input end of the first earphone is connected to the first audio input end of the second earphone), to prevent the loop formed on the second earphone from affecting the loop formed on the first earphone. Similarly, the processor disables the first earphone for the same purpose. In this way, when the first earphone or the second earphone is detected, the other earphone cannot work normally.

Therefore, after the first detection unit or the second detection unit completes the detection operation, the path for outputting the audio signal to the second earphone or the first earphone needs to be enabled immediately, to ensure that the second earphone and the first earphone can work normally.

According to the method used by a terminal to detect an earphone status provided in this embodiment of the present invention, an earphone to be detected does not need to be specified in advance, and both statuses of the first earphone and the second earphone are detected. In this way, a more accurate detection result can be provided.

Optionally, the method 300 further includes:

Step 505: The processor stops audio output to the second earphone if the second earphone is in an out-of-position state.

If the second earphone is in an out-of-position state, it indicates that the second earphone is not used by a user, and it is useless to input audio to the second earphone. Therefore, the processor stops in a timely manner audio output to the second earphone, to effectively reduce electricity consumed by audio output to the second earphone, achieving an effect of further saving electricity.

Figure 10:
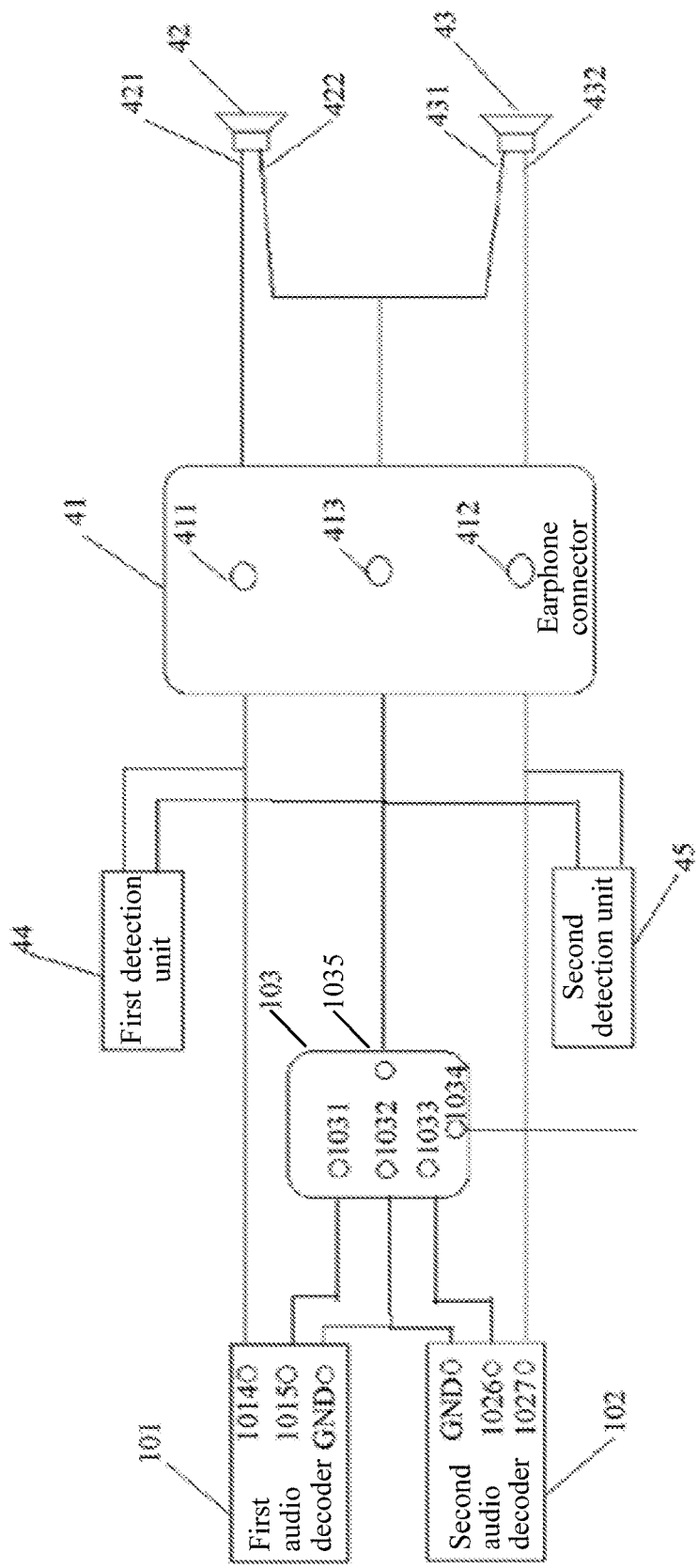
FIG. 10 is a diagram of a detailed connection relationship among a first audio decoder, a second audio decoder, a switching switch, an earphone connector, a first earphone, and a second earphone.

FIG. 10 is a diagram of a detailed connection relationship among a first audio decoder, a second audio decoder, a switching switch, an earphone connector, a first earphone, and a second earphone. In the diagram of the detailed connection relationship, a connection relationship among the first audio decoder, the second audio decoder, and the switching switch is added based on the connection manner in FIG. 9. Only content different from that of FIG. 9 is described in detail herein. For other content, refer to a related description in FIG. 9, and details are not described herein again.

It should be noted that, FIG. 10 is the diagram of the detailed connection relationship among the first audio decoder, the second audio decoder, the switching switch, the earphone connector, the first earphone, and the second earphone when both the first earphone and the second earphone need to be detected. When only the first earphone is detected, content related to third input of the switching switch may be omitted.

As shown in FIG. 10, the terminal further includes: a first audio decoder 101 configured to output an audio signal to the first earphone, a second audio decoder 102 configured to output an audio signal to the second earphone, and a switching switch 103, the first audio decoder includes a fourth audio output end 1014, a fifth audio output end 1015, and a GND terminal, the second audio decoder includes a sixth audio output end 1026, a seventh audio output end 1027, and a GND terminal; the fourth audio output end 1014 is connected to the first audio output end 411, and the seventh audio output end 1027 is connected to the second audio output end 412.

If earphone status detection needs to be performed on only the first earphone, the switching switch 103 includes a first input end 1031, a second input end 1032, a control end 1034, and an output end 1035, and the switching switch 103 is configured to: under control of a control signal that is input by the control end, connect the output end of the switching switch to either of the first input end and the second input end of the switching switch.

The fifth audio output end 1015 is connected to the first input end 1031 of the switching switch 103, the GND terminal of the first decoder 101 and the GND terminal of the second decoder 102 are connected to the second input end 1032 of the switching switch 103, and the output end 1035 of the switching switch 103 is connected to the third audio output end 413.

Optionally, the disabling, by the processor, a path for outputting an audio signal to the second earphone includes: inputting, by the processor, a first control signal to the control end 1034 of the switching switch 103, to control the first input end 1031 of the switching switch and the output end 1035 of the switching switch 103 to connect to each other.

Optionally, if earphone status detection needs to be performed on both the first earphone and the second earphone, the switching switch 103 further includes a third input end 1033, the switching switch 103 is specifically configured to: under control of a control signal that is input by the control end, connect the output end of the switching switch to one of the first input end, the second input end, and the third input end of the switching switch, and the sixth audio output end 1026 is connected to the third input end 1033 of the switching switch 103.

The disabling, by the processor, a path for outputting an audio signal to the first earphone includes: inputting, by the processor, a second control signal to the control end of the switching switch, to control the third input end of the switching switch and the output end of the switching switch to connect to each other.

Optionally, the terminal further includes a first audio decoder configured to output an audio signal to the first earphone, and the disabling, by the processor, a path for outputting an audio signal to the first earphone includes: controlling, by the processor, the first audio decoder to be disabled.

Optionally, the terminal further includes a second audio decoder configured to output an audio signal to the second earphone, and the disabling, by the processor, a path for outputting an audio signal to the second earphone includes: controlling, by the processor, the second audio decoder to be disabled.

It should be noted that the first audio decoder and the second audio decoder may be separate decoders, or may be integrated in a same audio decoder. This is not limited in this embodiment of the present invention.

It should be noted that, the first detection unit and the second detection unit may be two subunits of an integrated detection unit, or the first detection unit and the second detection unit may be separate detection units. The first detection unit and the second detection unit may be designed as separate hardware in the terminal, or may be used as one functional module and integrated into other hardware of the terminal, for example, may be integrated into a power amplifier, or may be integrated into a decoder, or may be integrated into a processor.

It should be noted that, if the power amplifier in the terminal is driven by a voltage, the voltage is constant. Therefore, the detection unit may detect only a current signal, and does not need to detect a voltage signal, where this constant voltage value is used as a voltage value. If the power amplifier in the terminal is driven by a current, the current is constant. Therefore, the detection unit may detect only a voltage signal, and does not need to detect a current signal, where this constant current value is used as a current value.

Figure 11:
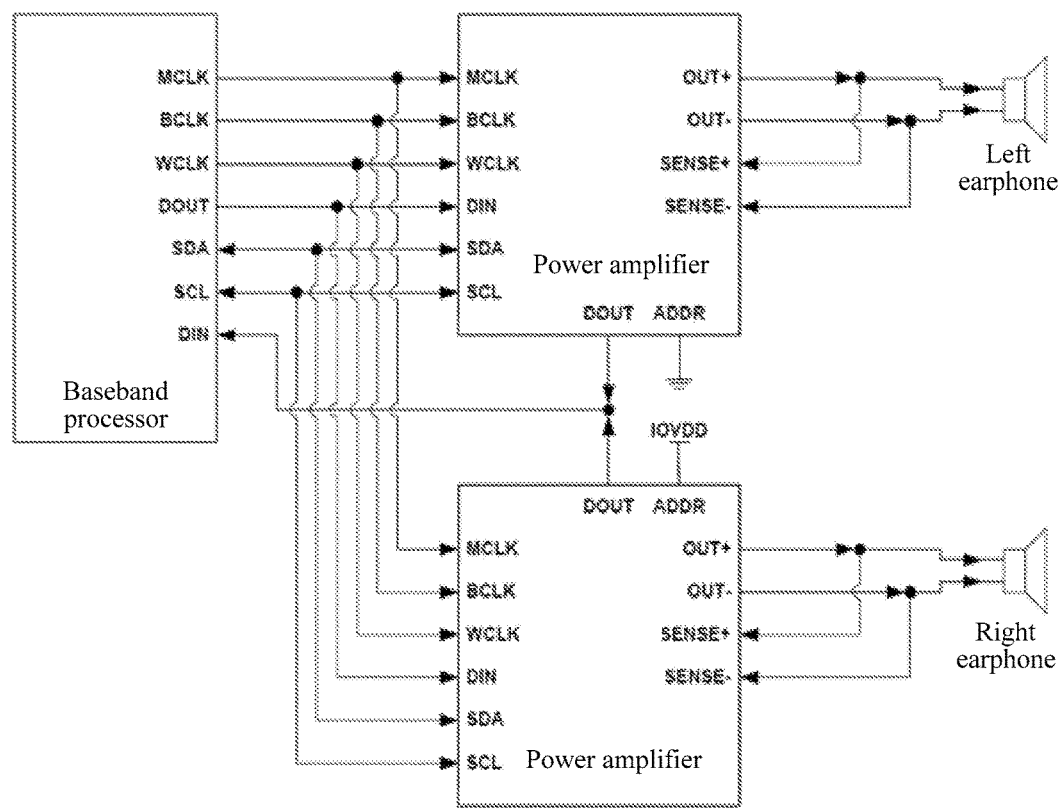
FIG. 11 is a drive circuit diagram of an earphone whose earphone status is detected according to an embodiment of the present invention.

FIG. 11 is a drive circuit diagram of an earphone whose earphone status is detected according to an embodiment of the present invention. As shown in FIG. 11, the detection unit is integrated into a power amplifier, and statuses of the left earphone and the right earphone need to be detected. Detection pins (sense+, sense−) are separately added to the power amplifier connected to the left earphone and the right earphone. The detection pins are configured to receive detected electrical signals, and the detection unit integrated in the power amplifier determines, according to the electrical signals received by the detection pins, whether an earphone is in position.

Figure 12:
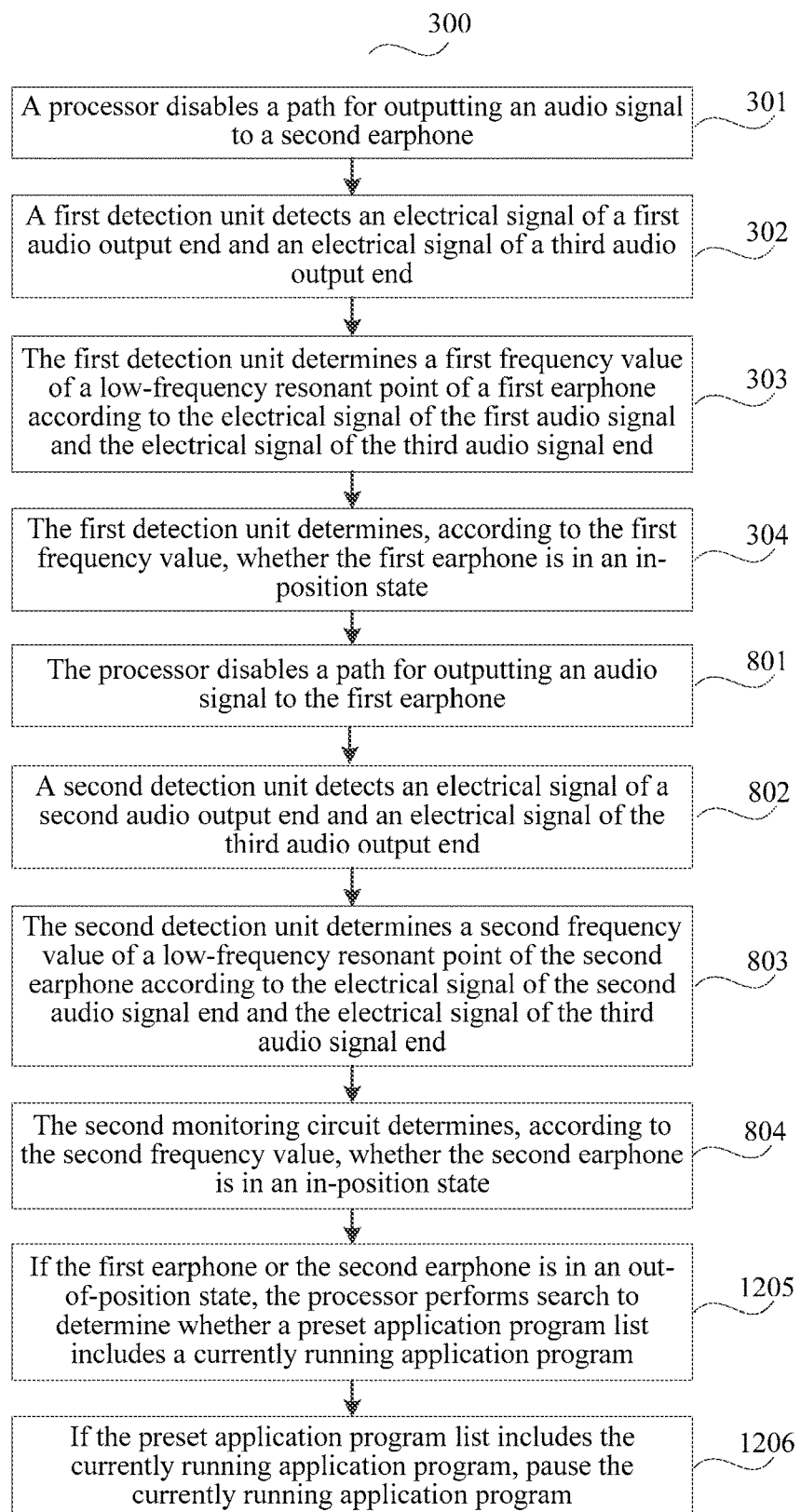
FIG. 12 shows a method used by a terminal to detect an earphone status according to still another embodiment of the present invention.

FIG. 12 shows a method used by a terminal to detect an earphone status according to still another embodiment of the present invention. This embodiment of the present invention is implemented based on the embodiment shown in FIG. 8, and only content different from that of FIG. 8 is described in detail herein. For other content, refer to a related description in FIG. 8, and details are not described herein again. The method 300 further includes:

Step 1205: If the first earphone or the second earphone is in an out-of-position state, the processor performs search to determine whether a preset application program list includes a currently running application program.

Step 1206: If the preset application program list includes the currently running application program, pause the currently running application program.

Optionally, the preset application program list includes a game application program or a video application program.

It should be noted that the preset application program list may store an audio-related application program, that is, an audio playback application program starts at the same time when the application program runs.

According to the method used by a terminal to detect an earphone status provided in this embodiment of the present invention, the processor performs search to determine whether a preset application program list includes a currently running application program, and if the preset application program list includes the currently running application program, the processor determines that no user uses the application program, and directly pauses the currently running application program. In this way, power consumption of the terminal can be further reduced.

Figure 13:
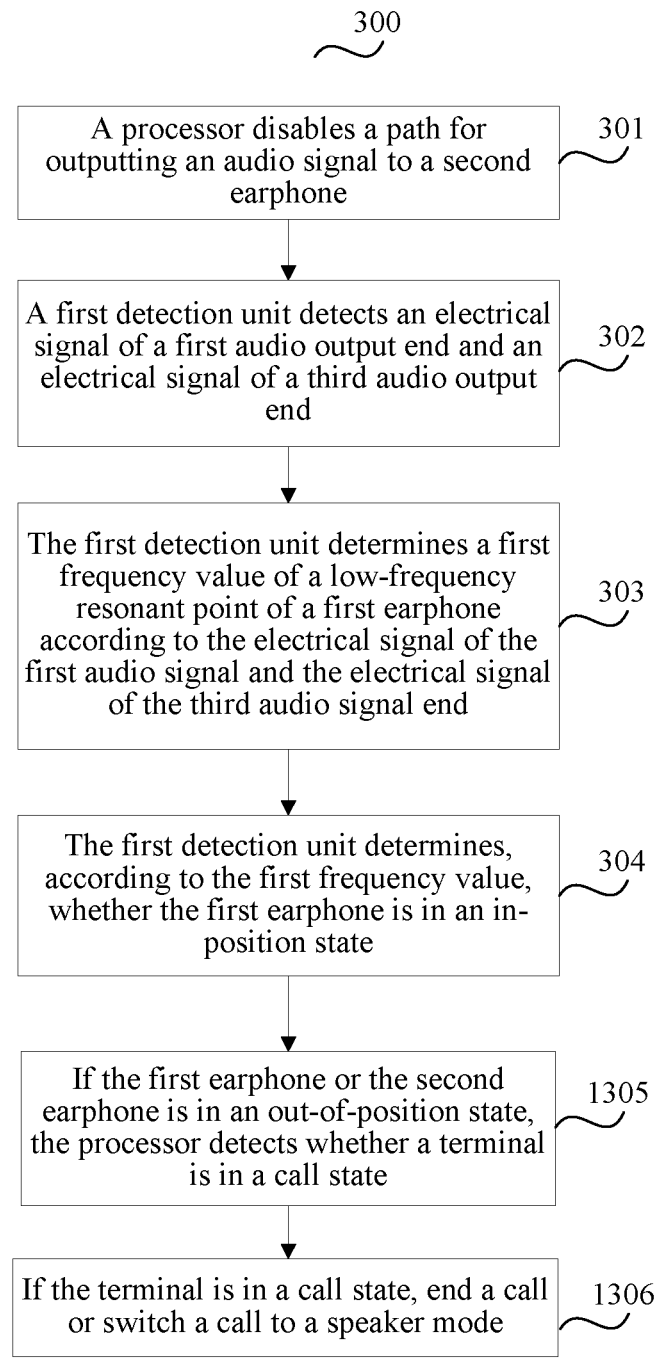
FIG. 13 shows a method used by a terminal to detect an earphone status according to still another embodiment of the present invention.

FIG. 13 shows a method used by a terminal to detect an earphone status according to still another embodiment of the present invention. This embodiment of the present invention is implemented based on the embodiment shown in FIG. 8, and only content different from that of FIG. 8 is described in detail herein. For other content, refer to a related description in FIG. 8, and details are not described herein again. As shown in FIG. 13, the method 300 further includes:

Step 1305: If the first earphone or the second earphone is in an out-of-position state, the processor detects whether the terminal is in a call state.

Step 1306: If the terminal is in a call state, end a call or switch a call to a speaker mode.

According to the method used by a terminal to detect an earphone status provided in this embodiment of the present invention, the processor detects whether the terminal is in a call state; and if the terminal is in a call state, the processor determines that a user may not be on a call or a user takes off an earphone and wants to use a speaker mode, and the processor ends the call or switches the call to a speaker mode. In this way, if the call is ended according to a product design, power consumption of the terminal can be further reduced. If the call is switched to a speaker mode according to a product design, a user can conveniently switch a call between an earphone mode and a speaker mode only by taking off the earphone. Therefore, user experience of the terminal is effectively improved.

The terminal provided in this embodiment of the present invention may be a tablet computer, a mobile phone, an MP3, an MP4, or the like; or may even be a wearable device or the like.

The terminal includes: a display screen, a memory, a processor, and a bus system.

The display screen may be a suitable apparatus such as a cathode ray tube (CRT, Cathode Ray Tube) display screen, a liquid crystal display (LCD, Liquid Crystal Display), or a touch display screen (Touch Display Screen), and receives an instruction by using the bus system so that the display screen displays a graphic user interface.

The memory may include a RAM or a ROM, or any irremovable storage medium, or a removable storage medium, and is configured to store a program that can execute this embodiment of the present invention or data of this embodiment of the present invention.

The processor is configured to execute the program stored in the memory in this embodiment of the present invention, and the processor and another apparatus may communicate with each other by using the system bus.

The memory and the processor may also be integrated into a physical module applied to this embodiment of the present invention, and the physical module stores and runs a program that implements this embodiment of the present invention.

The components of the terminal are coupled by using the bus system, and the bus system may further include a power source bus, a control bus, a status signal bus, and the like in addition to a data bus. However, for purpose of clear description, various buses are marked as the bus system in the figure.

Figure 14:
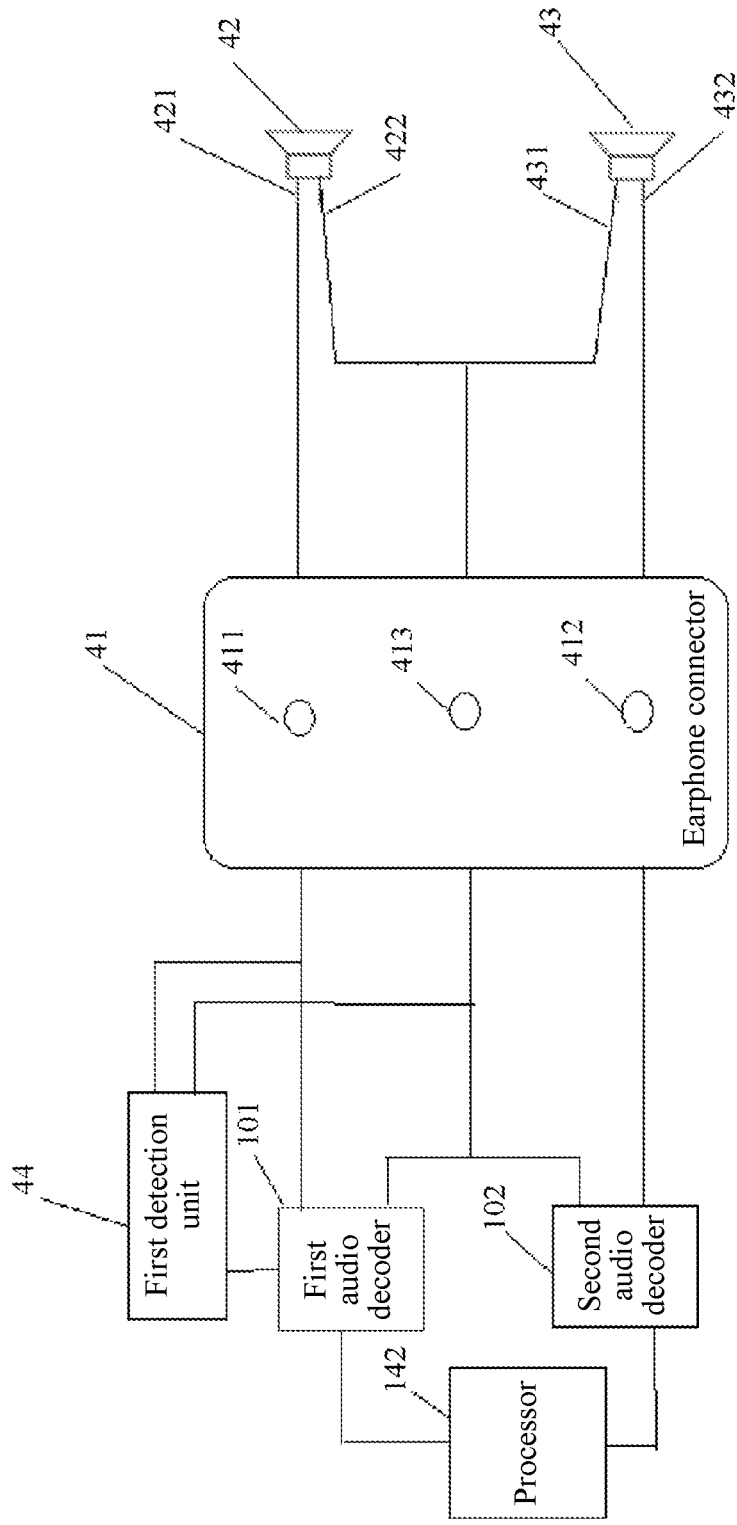
FIG. 14 is a schematic structural diagram of a terminal according to an embodiment of the present invention.

FIG. 14 is a schematic structural diagram of a terminal according to an embodiment of the present invention. The terminal further includes: an earphone connector 41, a first detection unit 44, a first audio decoder 101, a second audio decoder 102, and a processor 142. The first detection unit is separately connected to a first audio output end and a second audio output end. For a connection relationship among the earphone connector, a first earphone, and a second earphone, refer to FIG. 4, and details are not described herein again. The first audio decoder outputs an audio signal to the first earphone by using the first audio output end and the second audio output end. The second audio decoder is connected to the second audio output end and the third audio output end to output an audio signal to the second earphone. The processor 142 is connected to the first audio decoder 101 and the second audio decoder 102.

The processor 142 is configured to disable a path for outputting an audio signal to the second earphone.

The first detection unit 44 is configured to: after the processor 142 disables the path for outputting the audio signal to the second earphone, detect an electrical signal of the first audio output end and an electrical signal of the third audio output end.

The first detection unit 44 is further configured to: determine a frequency value of a low-frequency resonant point of the first earphone according to the electrical signal of the first audio signal end and the electrical signal of the third audio signal end, and determine, according to the frequency value of the low-frequency resonant point, whether the first earphone is in an in-position state. The in-position state refers to a state in which an area of a front sound cavity of the earphone is less than a first threshold.

It should be noted that, for a detailed processing process, refer to the descriptions in the embodiments corresponding to FIG. 3 and FIG. 4, and details are not described herein again.

According to the terminal provided in this embodiment of the present invention, the processor first disables the path for outputting the audio signal to the second earphone (currently, an earphone status of the second earphone is not detected); detects electrical signals of a first audio output end and a third audio output end of the first earphone; and determines a frequency value of a low-frequency resonant point of the first earphone according to the electrical signals of the first audio signal and the third audio signal end, and determines, according to the frequency value of the low-frequency resonant point, whether the first earphone is in an in-position state. In this way, only the electrical signals of the first audio signal and the third audio signal need to be detected, and it may be determined, according to changes of the electrical signals, whether the earphone is in position. Therefore, a status of the first earphone can be simply and quickly detected.

Optionally, the processor 142 is further configured to stop audio output to the first earphone if the first earphone is in an out-of-position state.

It should be noted that, for a detailed processing process, refer to the description in the embodiment corresponding to FIG. 5, and details are not described herein again.

If the first earphone is in an out-of-position state, it indicates that the first earphone is not used by a user, and it is useless to input audio to the first earphone. Therefore, the processor disables in a timely manner the path for outputting audio to the first earphone, to effectively reduce electricity consumed by audio output to the first earphone.

Optionally, the processor is configured to:

determine whether an audio signal is output to the first earphone and the second earphone; and if an audio signal is output to the first earphone and the second earphone, disable the path for outputting the audio signal to the second earphone.

It should be noted that, for a detailed processing process, refer to the description in the embodiment corresponding to FIG. 6, and details are not described herein again.

Optionally:

the processor is further configured to determine whether an audio source of the audio signal is being switched.

That the processor is configured to disable a path for outputting an audio signal to the second earphone is specifically: the processor is configured to: if an audio signal is output to the first earphone and the second earphone, and the audio source of the audio signal is being switched, disable, by the processor, the path for outputting the audio signal to the second earphone.

It should be noted that, for a detailed processing process, refer to the description in the embodiment corresponding to FIG. 7, and details are not described herein again.

According to the terminal provided in this embodiment of the present invention, an opportunity of switching an audio source is detected, and an earphone status is detected in a process of switching the audio source. In this way, normally playing the audio source by a user is not affected, and earphone status detection is already completed without being perceived by the user, thereby greatly improving user experience of the terminal.

Figure 15:
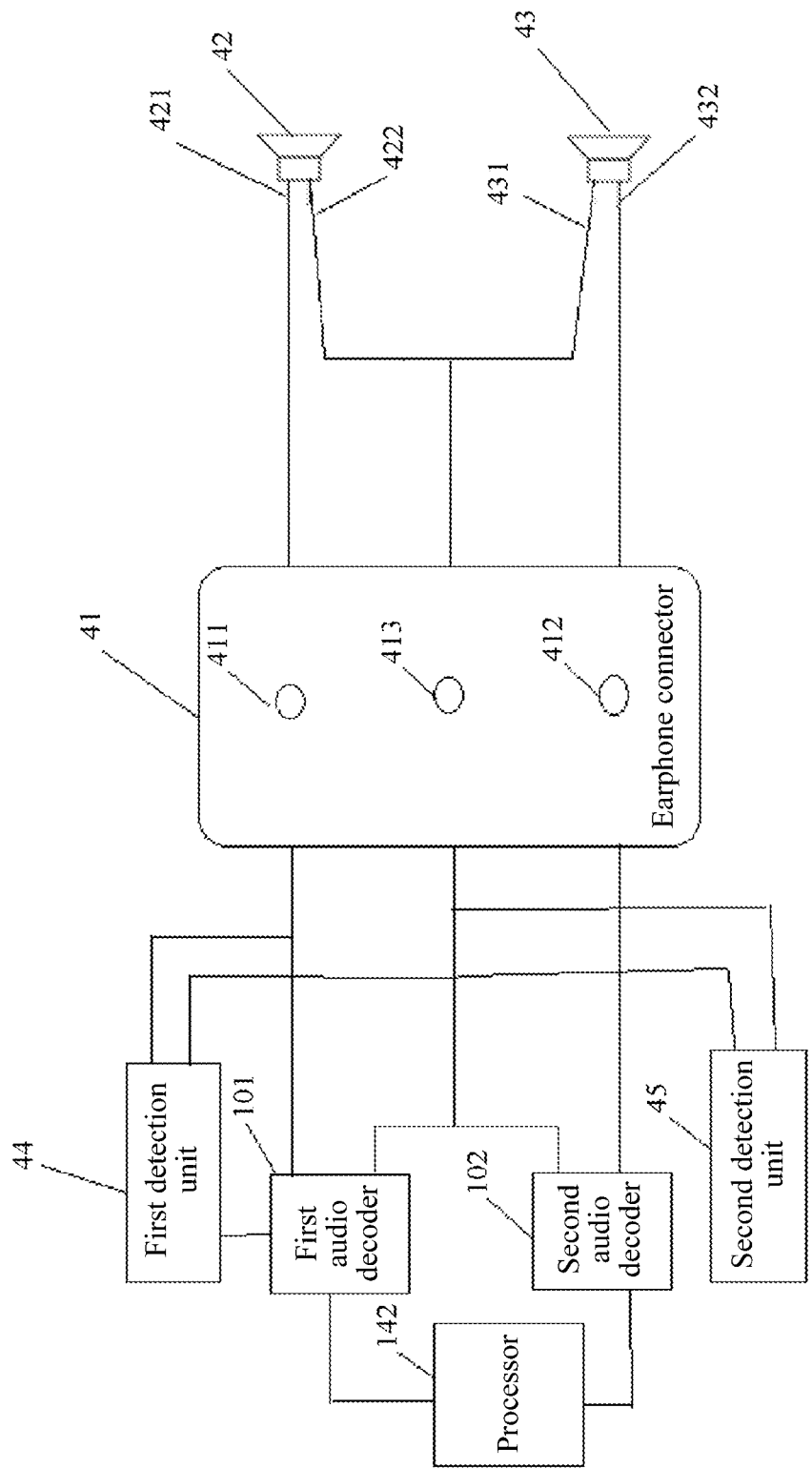
FIG. 15 is a schematic structural diagram of a terminal according to another embodiment of the present invention.

FIG. 15 is a schematic structural diagram of a terminal according to another embodiment of the present invention.

Optionally, the terminal further includes a second detection unit 45, and the second detection unit 45 is separately connected to the second audio output end and the third audio output end.

The processor 142 is further configured to disable a path for outputting an audio signal to the first earphone.

The second detection unit 45 is configured to: after the processor disables the path for outputting the audio signal to the first earphone, detect an electrical signal of the second audio output end and an electrical signal of the third audio output end.

The second detection unit 45 is further configured to: determine a frequency value of a low-frequency resonant point of the second earphone according to the electrical signal of the second audio signal end and the electrical signal of the third audio signal end, and determine, according to the frequency value of the low-frequency resonant point, whether the second earphone is in an in-position state.

It should be noted that, for a detailed processing process, refer to the descriptions in the embodiments corresponding to FIG. 8 and FIG. 9, and details are not described herein again.

According to the terminal provided in this embodiment of the present invention, an earphone to be detected does not need to be specified in advance, and both statuses of the first earphone and the second earphone are detected. In this way, a more accurate detection result can be provided.

Optionally, the processor is further configured to stop audio output to the second earphone if the second earphone is in an out-of-position state.

If the second earphone is in an out-of-position state, it indicates that the second earphone is not used by a user, and it is useless to input audio to the second earphone. Therefore, the processor stops in a timely manner audio output to the second earphone, to effectively reduce electricity consumed by audio output to the second earphone, achieving an effect of further saving electricity.

Figure 16:
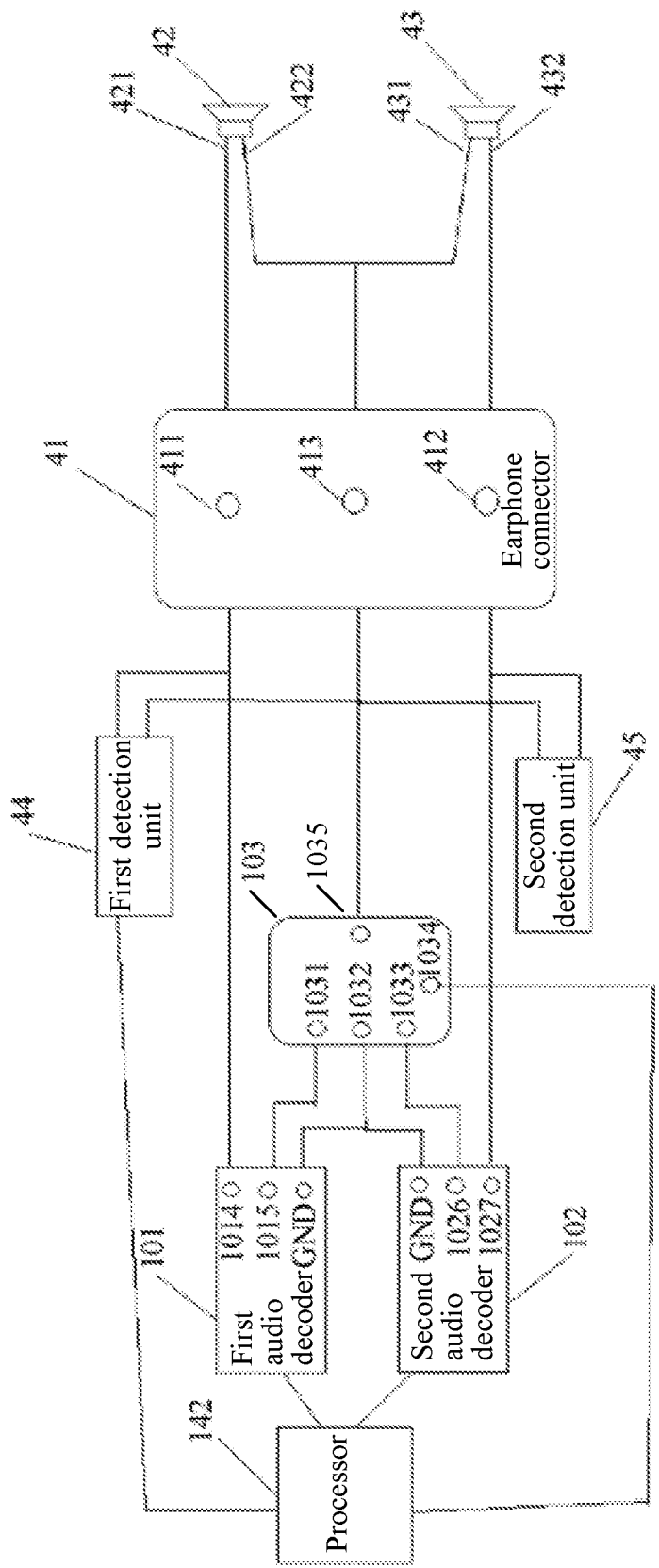
FIG. 16 is a schematic structural diagram of a terminal according to still another embodiment of the present invention.

FIG. 16 is a schematic structural diagram of a terminal according to still another embodiment of the present invention.

Optionally, referring to FIG. 9, the terminal further includes: a first audio decoder configured to output an audio signal to the first earphone, a second audio decoder configured to output an audio signal to the second earphone, and a switching switch, the first audio decoder includes a fourth audio output end, a fifth audio output end, and a GND terminal, the second audio decoder includes a sixth audio output end, a seventh audio output end, and a GND terminal; the fourth audio output end is connected to the first audio output end, and the seventh audio output end is connected to the second audio output end.

Referring to FIG. 10, if earphone status detection needs to be performed on only the first earphone, the switching switch includes a first input end, a second input end, an output end, and a control end, and the switching switch is configured to: under control of a control signal that is input by the control end, connect the output end of the switching switch to either of the first input end and the second input end of the switching switch.

The fifth audio output end is connected to the first input end of the switching switch, the GND terminal of the first decoder and the GND terminal of the second decoder are connected to the second input end of the switching switch, and the output end of the switching switch is connected to the third audio output end.

The processor is configured to input a first control signal to the control end of the switching switch, to control a third input end of the switching switch and the output end of the switching switch to connect to each other.

The processor is further configured to input a second control signal to the control end of the switching switch, to control the first input end of the switching switch and the output end of the switching switch to connect to each other.

Optionally, referring to FIG. 10, if earphone status detection needs to be performed on both the first earphone and the second earphone, the switching switch further includes a third input end, the switching switch is specifically configured to: under control of a control signal that is input by the control end, connect the output end of the switching switch to one of the first input end, the second input end, and the third input end of the switching switch, and the sixth audio output end is connected to the third input end of the switching switch.

The processor is further configured to input a second control signal to the control end of the switching switch, to control the third input end of the switching switch and the output end of the switching switch to connect to each other.

The processor is further configured to control the first audio decoder to be disabled.

The processor is further configured to control the second audio decoder to be disabled.

It should be noted that the first audio decoder and the second audio decoder may be separate decoders, or may be integrated in a same audio decoder. This is not limited in this embodiment of the present invention.

Optionally, that the processor is further configured to stop audio output to the first earphone if the first earphone is in an out-of-position state is specifically: the processor is further configured to: if the first earphone or the second earphone is in an out-of-position state, perform, by the processor, search to determine whether a preset application program list includes a currently running application program; and if the preset application program list includes the currently running application program, pause the currently running application program.

Optionally, the preset application program list includes a game application program or a video application program.

It should be noted that the preset application program list may store an audio-related application program, that is, an audio playback application program starts at the same time when the application program runs.

According to the terminal provided in this embodiment of the present invention, the processor performs search to determine whether a preset application program list includes a currently running application program, and if the preset application program list includes the currently running application program, the processor determines that no user uses the application program, and directly pauses the currently running application program. In this way, power consumption of the terminal can be further reduced.

Optionally, that the processor is further configured to stop audio output to the first earphone if the first earphone is in an out-of-position state is specifically: the processor is further configured to: if the first earphone or the second earphone is in an out-of-position state, detect, by the processor, whether the terminal is in a call state; and if the terminal is in a call state, end a call or switch a call to a speaker mode.

According to the terminal provided in this embodiment of the present invention, the processor detects whether the terminal is in a call state; and if the terminal is in a call state, the processor determines that a user may not be on a call or a user takes off an earphone and wants to use a speaker mode, and the processor ends the call or switches the call to a speaker mode. In this way, if the call is ended according to a product design, power consumption of the terminal can be further reduced. If the call is switched to a speaker mode according to a product design, a user can conveniently switch a call between an earphone mode and a speaker mode only by taking off the earphone. Therefore, user experience of the terminal is effectively improved.

The hardware of the terminal in this embodiment of the present invention may be configured to execute the procedures of the methods used by a terminal to detect an earphone status shown in FIG. 3 to FIG. 11. A specific working procedure thereof is no longer described in detail, and for details, refer to the descriptions in the method embodiments.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method applied to a terminal to detect an earphone status, wherein the terminal comprises a processor, an earphone connector, and a first detector, the earphone connector comprises a first audio output end, a second audio output end, and a third audio output end, the first audio output end is configured to connect to a first audio input end of an externally connected first earphone, the second audio output end is configured to connect to a second audio input end of an externally connected second earphone, the third audio output end is configured to connect to a second audio input end of the first earphone and a first audio input end of the second earphone, and the method comprises:

disabling, by the processor, a path for outputting second audio signal to the second earphone;

after the processor disables the path for outputting the second audio signal to the second earphone, detecting, by the first detector, an electrical signal of the first audio output end and an electrical signal of the third audio output end;

determining, by the first detector, a first frequency value of a low-frequency resonant point of the first earphone according to the electrical signal of the first audio output end and the electrical signal of the third audio output end; and determining, by the first detector according to the first frequency value, whether the first earphone is in an in-position state.

2. The method according to claim 1, wherein the method further comprises: stopping, by the processor, audio output to the first earphone when the first earphone is in an out-of-position state.

3. The method according to claim 1, wherein before the disabling the path for outputting the second audio signal to the second earphone, the method further comprises:

determining, by the processor, whether an audio signal is output to the first earphone and the second earphone; and when the audio signal is output to the first earphone and the second earphone, performing, by the processor, the disabling the path for outputting the second audio signal to the second earphone.

4. The method according to claim 3, wherein after the processor determines that the audio signal is output to the first earphone and the second earphone, and before the disabling the path for outputting the second audio signal to the second earphone, the method further comprises:

determining, by the processor, whether an audio source of the audio signal is being switched; and when the audio source of the audio signal is being switched, performing, by the processor, the disabling the path for outputting the second audio signal to the second earphone.

5. The method according to claim 1, wherein the terminal further comprises a second detector, and the method further comprises:

disabling, by the processor, a path for outputting first audio signal to the first earphone;

detecting, by the second detector, an electrical signal of the second audio output end and an electrical signal of the third audio output end;

determining, by the second detector, a second frequency value of a low-frequency resonant point of a front sound cavity of the second earphone according to the electrical signal of the second audio signal end and the electrical signal of the third audio signal end; and determining, by the second detector according to the second frequency value, whether the second earphone is in an in-position state.

6. The method according to claim 5, wherein the method further comprises: stopping, by the processor, audio output to the second earphone when the second earphone is in an out-of-position state.

7. The method according to claim 1, wherein the terminal further comprises: a first audio decoder configured to output first audio signal to the first earphone, a second audio decoder configured to output the second audio signal to the second earphone, and a switching switch, the first audio decoder comprises a fourth audio output end, a fifth audio output end, and a GND terminal, the second audio decoder comprises a sixth audio output end, a seventh audio output end, and a GND terminal; the fourth audio output end is connected to the first audio output end, and the seventh audio output end is connected to the second audio output end;

the switching switch comprises a first input end, a second input end, an output end, and a control end, and the switching switch is configured to: under control of a control signal that is input by the control end, connect the output end of the switching switch to either of the first input end and the second input end of the switching switch;

the fifth audio output end is connected to the first input end of the switching switch, the GND terminal of the first decoder and the GND terminal of the second decoder are connected to the second input end of the switching switch, and the output end of the switching switch is connected to the third audio output end; and wherein the disabling the path for outputting the second audio signal to the second earphone comprises: inputting, by the processor, a first control signal to the control end of the switching switch, to control the first input end of the switching switch and the output end of the switching switch to connect to each other.

8. The method according to claim 7, wherein the switching switch further comprises a third input end, the switching switch is configured to: under control of a control signal that is input by the control end, connect the output end of the switching switch to one of the first input end, the second input end, and the third input end of the switching switch, and the sixth audio output end is connected to the third input end of the switching switch; and wherein the disabling the path for outputting the second audio signal to the second earphone comprises: inputting, by the processor, a second control signal to the control end of the switching switch, to control the third input end of the switching switch and the output end of the switching switch to connect to each other.

9. The method according to claim 5, wherein the terminal further comprises a first audio decoder configured to output the first audio signal to the first earphone; and wherein the disabling the path for outputting the first audio signal to the first earphone comprises: disabling, by the processor, the first audio decoder.

10. The method according to claim 9, wherein the terminal further comprises a second audio decoder configured to output the second audio signal to the second earphone; and wherein the disabling the path for outputting the second audio signal to the second earphone comprises: disabling, by the processor, the second audio decoder.

11. A terminal, comprising: a processor, an earphone connector, a first detector, a first audio decoder, and a second audio decoder, wherein the earphone connector comprises: a first audio output end, a second audio output end, and a third audio output end, the first audio output end is configured to connect to a first audio input end of an externally connected first earphone, the second audio output end is configured to connect to a second audio input end of an externally connected second earphone, the third audio output end is configured to connect to a second audio input end of the first earphone and a first audio input end of the second earphone, the first detector is separately connected to the first audio output end and the third audio output end, the first audio decoder outputs first audio signal to the first earphone by using the first audio output end and the second audio output end, the second audio decoder is connected to the second audio output end and the third audio output end to output second audio signal to the second earphone, wherein the processor is configured to disable a path for outputting the second audio signal to the second earphone; and wherein the first detector is configured to:
detect an electrical signal of the first audio output end and an electrical signal of the third audio output end;
determine a frequency value of a low-frequency resonant point of the first earphone according to the electrical signal of the first audio output end and the electrical signal of the third audio output end; and
determine, according to the frequency value of the low-frequency resonant point, whether the first earphone is in an in-position state.

12. The terminal according to claim 11, wherein the processor is further configured to stop audio output to the first earphone when the first earphone is in an out-of-position state.

13. The terminal according to claim 11, wherein
the processor is further configured to determine whether an audio signal is output to the first earphone and the second earphone; and when the processor is configured to disable the path for outputting the second audio signal to the second earphone, the processor is configured to: when the audio signal is output to the first earphone and the second earphone, disable the path for outputting the second audio signal to the second earphone.

14. The terminal according to claim 13, wherein
the processor is further configured to determine whether an audio source of the audio signal is being switched; and when the processor is configured to disable the path for outputting the second audio signal to the second earphone, the processor is configured to: when the audio signal is output to the first earphone and the second earphone, and the audio source of the audio signal is being switched, disable the path for outputting the second audio signal to the second earphone.

15. The terminal according to claim 11, wherein the terminal further comprises a second detector which is separately connected to the second audio output end and the third audio output end;

the processor is further configured to disable a path for outputting the first audio signal to the first earphone;

the second detector is configured to: after the processor disables the path for outputting the first audio signal to the first earphone, detect an electrical signal of the second audio output end and the electrical signal of the third audio output end; and the second detector is further configured to: determine a frequency value of a low-frequency resonant point of the second earphone according to the electrical signal of the second audio signal end and the electrical signal of the third audio signal end, and determine, according to the frequency value of the low-frequency resonant point, whether the second earphone is in an in-position state.

16. The terminal according to claim 15, wherein the processor is further configured to stop audio output to the second earphone when the second earphone is in an out-of-position state.

17. The terminal according to claim 11, wherein the terminal further comprises a switching switch, the first audio decoder comprises a fourth audio output end, a fifth audio output end, and a GND terminal, the second audio decoder comprises a sixth audio output end, a seventh audio output end, and a GND terminal, the fourth audio output end is connected to the first audio output end, and the seventh audio output end is connected to the second audio output end;

the switching switch comprises a first input end, a second input end, an output end, and a control end, and the switching switch is configured to: under control of a control signal that is input by the control end, connect the output end of the switching switch to either of the first input end and the second input end of the switching switch;

the fifth audio output end is connected to the first input end of the switching switch, the GND terminal of the first decoder and the GND terminal of the second decoder are connected to the second input end of the switching switch, and the output end of the switching switch is connected to the third audio output end; and the processor is further configured to input a first control signal to the control end of the switching switch, to control the first input end of the switching switch and the output end of the switching switch to connect to each other.

18. The terminal according to claim 17, wherein the switching switch further comprises: a third input end, the switching switch is configured to: under control of a control signal that is input by the control end, connect the output end of the switching switch to one of the first input end, the second input end, and the third input end of the switching switch, and the sixth audio output end is connected to the third input end of the switching switch; and the processor is further configured to input a second control signal to the control end of the switching switch, to control the third input end of the switching switch and the output end of the switching switch to connect to each other.

19. The terminal according to claim 11, wherein the processor is further configured to disable the first audio decoder.

20. The terminal according to claim 19, wherein the processor is further configured to disable the second audio decoder.

* * * * *